United States Patent Office 3,426,136
Patented Feb. 4, 1969

3,426,136
METHOD FOR THE TREATMENT OF CARDIAC DYSRHYTHMIAS WITH SODIUM THIOGLYCOLLATE
Martin F. Tansy, Philadelphia, Pa., assignor to Temple University, Philadelphia, Pa., a corporation of Pennsylvania
No Drawing. Filed Nov. 17, 1966, Ser. No. 595,038
U.S. Cl. 424—317                            6 Claims
Int. Cl. A61k 25/00, 27/00

ABSTRACT OF THE DISCLOSURE

Sodium thioglycollate, administered parenterally or orally is effective in terminating cardiac dysrhythmias in mammals.

---

This invention is directed to the pharmacotherapeutic treatment of cardiac dysrhythmias.

A wide variety of agents have been tested for their preventive and/or corrective value against cardiac dysrhythmias. Such agents have included quinidine and procainamide. However, existing antiarrhythmics have not proven satisfactory, mainly due to their high toxicity. As a result, synchronized precordial counter-shock is widely used for dysrhythmic therapy.

This invention has as an object the provision of a new pharmacotherapeutic process for the treatment of cardiac dysrhythmias.

This invention has as another object the provision of a method for effecting protective and corrective action against induced dysrhythmias in dogs.

Other objects will appear hereinafter.

I have discovered that sodium thioglycollate, sometimes known as sodium mercaptoacetate is an effective antiarrhythmic when administered intravenously or orally to mammals, and in particular to dogs undergoing induced dysrhythmias.

In particular, I have prevented both catecholamine induced and cardiac glycoside induced dysrhythmias by either the oral administration or parenteral injection of sodium thioglycollate. The catecholamine induced dysrhythmias were provoked by the injection of excess catecholamines, such as epinephrine, norepinephrine, ephedrine, aramine, and neosynephrine using conventional techniques in the presence of an anesthetic agent, such as chloroform, cyclopropane, or trichloroethylene.

In 70 observations in 5 different dogs, the corrective results of sodium thioglycollate as an antiarrhythmic for catecholamine induced dysrhythmias was observed without exception. The effectiveness of sodium thioglycollate as an antiarrhythmic was noted when dosages of 4 milligrams per kilogram of dog body weight or more were administered intravenously, or when dosages of 50 milligrams per kilogram of dog body weight or more were administered orally.

The antiarrhythmic effectiveness of sodium thioglycollate was demonstrated with dysrhythmias induced by the injection of cardiac glycosides, such as oubain and digitalis. However, the amount of sodium thioglycollate required to correct cardiac glycoside induced dysrhythmias was somewhat greater than that required to correct catecholamine induced dysrhythmias. By way of example, on the order of at least 100 milligrams per kilogram of dog body weight of sodium thioglycollate was required to be administered orally to correct a dysrhythmia provoked by the injection of a cardiac glycoside such as oubain. The sodium thioglycollate was found to be effective in the treatment of dysrhythmias in which the oubain concentration was at a toxic level, such as 0.25 milligram. In particular, the sodium thioglycollate was found to be effective in restoring the normal sinus rhythm in the oubain intoxicated animal without any accompanying circulatory depressor effects.

Regardless of the mechanism, the electrocardiographic picture was the same whether the ventricular fibrillation was induced by the catecholamine or glycoside. The mechanism by which sodium thioglycollate restores a normal sinus rhythm is unknown. However, it has the unusual property of being able to suppress abnormal impulse formation without depressing the contractile properties of the myocardium. Examination of the EKG demonstrates that this agent suppresses the automaticity of ventricular ectopic foci. Suppression of the ventricular automatic focus permits the normal pacemaker region to resume control of the cardiac rhythm. It appears that sodium thioglycollate has the ability to revert the abnormal heart rhythm by inducing again the predominance of the normal pacemaker.

Regardless of the mode of administration, the sodium thioglycollate in itself at any concentration has no apparent effect on the respiratory tract, cardiovascular system (EKG and blood pressure), CNS function (depression or stimulation), or gastrointestinal function (nausea, vomiting, and diarrhea). In reference to the gastrointestinal tract, using the classical tissue bath technique, intestinal strips from 12 rabbits were unaffected by repeated administration of sodium thioglycollate.

I have determined that sodium thioglycollate is non-toxic in extremely large doses, both when administered orally and when administered intravenously. In experiments with 23 separate dogs, the sodium thioglycollate proved non-toxic in each instance. In acute preparations (dogs under nembutal anesthesia 30 mg./kg.), a 12 kilogram dog tolerated 8 grams of sodium thioglycollate intravenously without succumbing. In the chronic unanesthetized dog, studies on 3 dogs revealed that the animal could withstand single doses of sodium thioglycollate i.v. from 15 milligrams through 1 gram without any apparent after effects. As a result, doses of 150 through 300 mg./kg. did not produce death when given intravenously to dogs. However, it does appear that at levels of 500 to 600 milligrams per kilogram, sodium thioglycollate is toxic. However, this toxicity is reversible. On post mortem examination, no gross pathology was noted, and examination of the heart, liver, kidney, adrenals, spleen, and pancreas upon microscopic examination exhibited no organ alteration attributable to the sodium thioglycollate.

The sodium thioglycollate is administered intravenously in isotonic solutions, and may be administered orally in aqueous solutions.

The present invention may be embodied in other specific forms without departing from the spirit or essential attributes thereof and, accordingly, reference should be made to the appended claims, rather than to the foregoing specification as indicating the scope of the invention.

It is claimed:
1. A method for correcting cardiac dysrhythmias in mammals which comprises administering sodium thioglycollate to a mammal undergoing said cardiac dysrhythmia in an amount sufficient to correct the cardiac dysrhythmia but below the concentration of the sodium thioglycollate which is toxic to the mammal.

2. A method in accordance with claim 1 in which the sodium thioglycollate is administered to the mammal by oral ingestion.

3. A method in accordance with claim 1 in which the sodium thioglycollate is administered to the mammal by parenteral injection.

4. A method in accordance with claim 1 in which the mammal is a dog.

5. A method in accordance with claim 4 in which at least four milligrams per kilogram of body weight of sodium thioglycollate were administered intravenously.

6. A method in accordance with claim 4 in which at least fifty milligrams of sodium thioglycollate per kilogram of body weight was administered orally.

References Cited

Chem. Abst. (I), 51:6855(b) (1957).
Chem. Abst. (II), 51:12318(b) (1957).

ALBERT T. MEYERS, *Primary Examiner.*

S. FRIEDMAN, *Assistant Examiner.*